US008490023B2

(12) United States Patent
Carteri et al.

(10) Patent No.: US 8,490,023 B2
(45) Date of Patent: Jul. 16, 2013

(54) NAVIGATING UML DIAGRAMS

(75) Inventors: Francesco Maria Carteri, Rome (IT); Alessandro Donatelli, Rome (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/062,886

(22) Filed: Apr. 4, 2008

(65) Prior Publication Data

US 2008/0229253 A1 Sep. 18, 2008

(30) Foreign Application Priority Data

Oct. 7, 2005 (EP) .................................... 05109308

(51) Int. Cl.
*G06F 3/048* (2006.01)
(52) U.S. Cl.
USPC ............................ 715/854; 717/101; 715/853
(58) Field of Classification Search
USPC .................. 715/853, 854; 717/100, 101, 102
See application file for complete search history.

(56) References Cited

U.S. PATENT DOCUMENTS

| | | | | |
|---|---|---|---|---|
| 6,145,000 | A * | 11/2000 | Stuckman et al. | 709/219 |
| 6,157,364 | A * | 12/2000 | Kohler | 715/855 |
| 6,205,575 | B1 | 3/2001 | Sherman et al. | |
| 2001/0054089 | A1 * | 12/2001 | Tso et al. | 709/219 |
| 2003/0222890 | A1 * | 12/2003 | Salesin et al. | 345/629 |

FOREIGN PATENT DOCUMENTS

| | | |
|---|---|---|
| JP | 2002-157120 A | 5/2002 |
| WO | 01/86483 A3 | 11/2001 |

OTHER PUBLICATIONS

Mark H. Walker and Nanette Eaton, Microsoft Office Visio 2003 Inside Out, Nov. 19, 2003, Microsoft Press, pp. 133-151 and 527-554.*
Mark H. Walker and Nanette Eaton, Microsoft Office Visio 2003 Inside Out, Nov. 19, 2003, Microsoft Press, pp. 318-335.*
JMU Office of Information Technology: "Microsoft PowerPoint Tutorials—Creating a Custom Slideshow" [Online], XP002401883 (Sep. 1, 2004); http://www.jmu.edu/computing/ittraining/tutorials/microsoft/powerpoint/lesson7.shtml.
Notification of Transmittal of the International Search Report and the Written Opinion of the International Searching Authority for PCT Application No. PCT/EP20061063043, mailing date of Oct. 27, 2006, European Patent Office, Rijswijk, Netherlands.
Written Opinion of the International Searching Authority for PCT Application No. PCT/EP2006/063043, Apr. 7, 2008, European Patent Office, Munich, Germany.

(Continued)

*Primary Examiner* — Matt Kim
*Assistant Examiner* — William Trapanese
(74) *Attorney, Agent, or Firm* — Thomas E. Lees, LLC

(57) ABSTRACT

A solution for navigating UML diagrams (200) is proposed. For this purpose, a graphical interface is implemented for defining multiple navigation paths ($NAV_k$) along corresponding sequences of diagrams ($DIA_{11}$-$DIA_{55}$). The definition of those navigation paths is stored into a dedicated file (without modifying the definition of the diagrams). A home bar for invoking the navigation paths is then added to the graphical representation of the diagrams. Once a reader has selected a specific navigation path, its first diagram ($DIA_{11}$; $DIA_{15}$) is retrieved and displayed. At the same time, a navigation bar for moving throughout the sequence is dynamically generated and added to the graphical representation of each diagram that is traversed.

19 Claims, 5 Drawing Sheets

OTHER PUBLICATIONS

Notification Concerning Transmittal of Copy of International Preliminary Report on Patentability for PCT Application No. PCT/EP2006/063043, Apr. 8, 2008, the International Bureau of WIPO, Geneva, Switzerland.

Hideki Tai, Takashi Nerome, Mari Abe and Kohici Ono; "A Way to Increase the Efficiency of Web Application Development", PROVISION, Japan, IBM Japan, Ltd. Oct. 29, 2004, vol. II, No. 4, pp. 62 to 68.

* cited by examiner

NAVIGATING UML DIAGRAMS

CROSS-REFERENCE TO RELATED APPLICATIONS

This application is a continuation of International Application No. PCT/EP2006/063043, filed Jun. 9, 2006 entitled "METHOD, SYSTEM AND COMPUTER PROGRAM FOR NAVIGATING UML DIAGRAMS", which claims priority to EP 05109308.6, filed Oct. 7, 2005.

FIELD OF THE INVENTION

The present invention relates to the information technology field. More specifically, the present invention relates to the navigation of graph structures.

BACKGROUND ART

Graphs are commonly used in computer science to represent a number of different structures. Informally, a graph consists of a set of objects (nodes or vertices) with corresponding connections (arcs or edges). Each arc may also be assigned a direction; in this case, the arc is used to move from a (source) node to a (target) node.

An example of structure that can be represented as a graph is the complex of models that are generally defined during the process of developing computer software (such as large software applications). Each model consists of an abstraction, which provides a simplified representation of the corresponding real artifact to be built. Preferably, the models are defined by using the Unified Modeling Language (UML). The UML is a standard modeling language, which provides the (graphical and textual) syntax and the underlying semantic for specifying all the aspects relating to the development process (especially for computer software of the object-oriented type). Several modeling tools are available in the art for this purpose; generally, a modeling tool provides an Integrated Development Environment (IDE) for supporting the various phases relating to the building of each software application (for example, its requirement definition, architectural design, code specification, and the like). A very popular example of commercial modeling tool is the "Rational Rose" by IBM Corporation.

The models aid software developers to master the inherent complexity of the development process. Particularly, in this way it is possible to visualize, assess and communicate the software application before its actual realization (so as to reduce the risks of the corresponding development). Moreover, the models may be used to create and maintain the code of the software application in a very simple, safe and time effective manner.

A problem in the modeling of computer software is the proliferation of artifacts that are generated during the development process. Indeed, a complex software application generally involves the definition of multiple models, typically based on the contributions of different developers (such as functional models, object models, or dynamic models). In turn, each model is represented by a number of diagrams (such as use case, class, object, deployment, sequence, activity, collaboration, or statechart diagrams). As a result, the available information may be very confusing.

In order to help readers to move among the diagrams, most modeling tools generally allow inserting hyperlinks into the diagrams. Each hyperlink in a generic diagram automatically fetches another diagram and then causes its displaying. In this way, the diagrams may be organized into a graph (which may be traversed from one diagram to another by means of the available hyperlinks).

However, each diagram will generally include several hyperlinks (to diagrams of either the same model or other models) that have been inserted by the different developers (such as end-users, architects, designers, and programmers). Therefore, the resulting structure is very chaotic.

In any case, the hyperlinks must be hard-coded in the desired diagrams. Therefore, this operation is time-consuming; moreover, any change requires updating the definition of the corresponding diagram and it is then prone to errors.

Those drawbacks are particularly acute in the development process of complex software applications, which are intended to run in a multi-tier and heterogeneous environment (for example, with distributed architecture or to be integrated in other systems).

All of the above reduces the effectiveness of the modeling process. This may have a detrimental impact on the yield of the whole development process (thereby increasing its length and cost) and on the quality of the resulting software applications.

SUMMARY OF THE INVENTION

According to the present invention, the idea of defining different ways of navigating the graph structure is suggested.

Particularly, an aspect of the invention proposes a method for navigating a graph structure. The graph structure includes a plurality of nodes, each one having a graphical representation. The method starts with the step of defining a plurality of navigation paths (each one along a corresponding sequence including a set of nodes). One of the navigation paths is then selected. The method continues by traversing the nodes of the selected navigation path. The graphical representation of each traversed node is then displayed.

In a preferred embodiment of the invention, this result is achieved by displaying a navigation structure (with one or more navigation commands for traversing the corresponding sequence) in addition to the graphical representation of each traversed node.

Typically, the navigation commands include a forward command (for moving to a next node) and/or a backward command (for moving to a preceding node).

In a specific implementation, for this purpose a navigation bar is added to a window used to represent the graphical representation of each traversed node.

Preferably, the definitions of the graph and of the navigation paths are stored in distinct memory structures.

In a preferred embodiment of the invention, the navigation bar is added dynamically to the graphical representation of each traversed node.

As a further improvement, the definition of the navigation paths is obtained by means of a graphical interface.

For example, the proposed solution finds application with respect to UML diagrams.

Another aspect of the invention proposes a computer program for performing this method.

A further aspect of the invention proposes a corresponding system.

The characterizing features of the present invention are set forth in the appended claims. The invention itself, however, as well as further features and the advantages thereof will be best understood by reference to the following detailed description, given purely by way of a non-restrictive indication, to be read in conjunction with the accompanying drawings.

DETAILED DESCRIPTION

Figure 1:
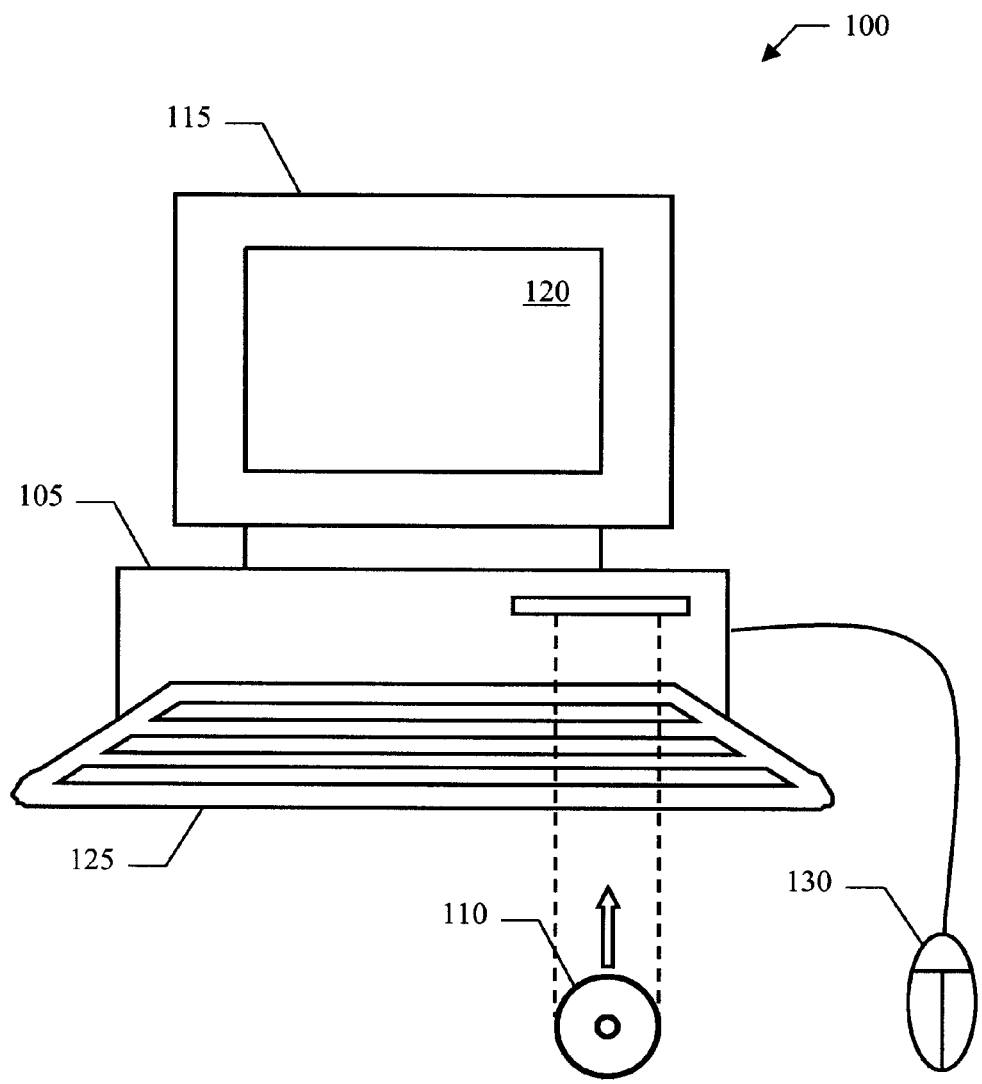
FIG. 1 is a pictorial representation of a computer in which the solution according to an embodiment of the invention can be implemented.

With reference in particular to FIG. 1, a computer 100 (for example, a PC) is shown. The computer 100 includes a central unit 105, which houses the electronic circuits controlling its operation (such as a microprocessor and a working memory). The computer 100 is also provided with a hard-disk and a drive for CD-ROMs 110. A monitor 115 is used to display images on a screen 120. Operation of the computer 100 is controlled by means of a keyboard 125 and a mouse 130, which are connected to the central unit 105 in a conventional manner. The above-described computer 100 is used to model software applications. Preferably, the models are defined in the UML format. Particularly, the UML supports functional models (specifying the operation of the software applications from the point of view of its end-users), object models (specifying the structure of the software applications in object-oriented terms), and dynamic models (specifying the behavior of the software applications); typically, those models are represented graphically by means of corresponding diagrams. For example, use case diagrams show the interactions between the end-users and the software applications (for the functional models). Likewise, class diagrams show the classes of the software applications with their relations, object diagrams show the corresponding instances, and deployment diagrams show the hardware/software components of the software applications (for the object models). At the end, sequence diagrams show the interactions over time between different components of the software applications, activity diagrams show the sequence of activities performed by the components, collaboration diagrams show the interactions between the components over time, and statechart diagrams show the states of the components with their transitions (for the dynamic models).

Figure 2:
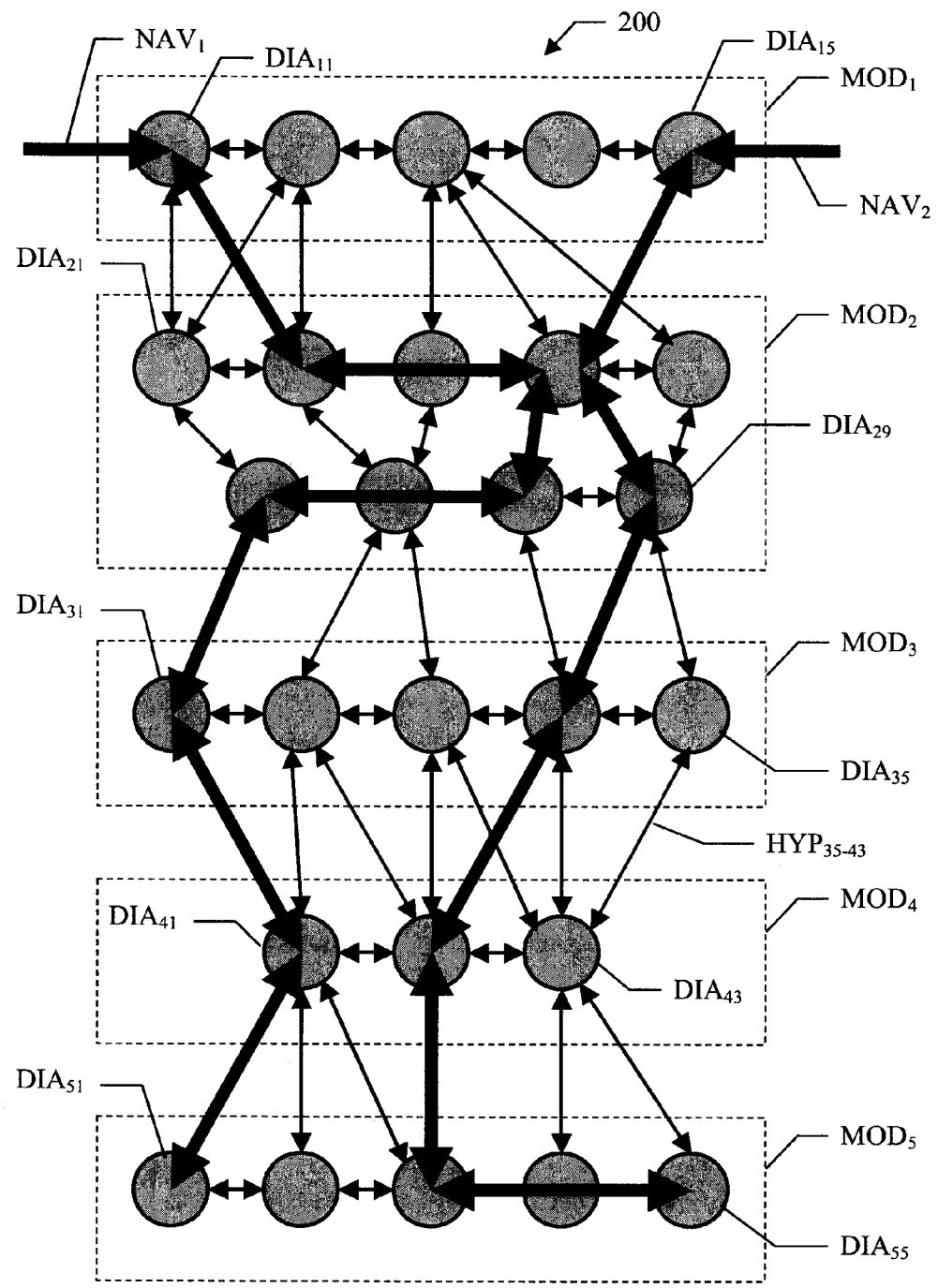
FIGS. 2, 3a-3c and 4 are schematic representations of exemplary applications of the solution according to an embodiment of the invention.

For example, as shown in FIG. 2, a generic software application has been defined with five models $MOD_i$ (with i=1-5). Each model $MOD_1$ in turn includes multiple diagrams $DIA_{ij}$, each one represented with a circle (with j=1-5, j=1-9, j=1-5, j=1-3, and j=1-5, respectively). The diagrams $DIA_{ij}$ are connected among them by means of corresponding hyperlinks, each one represented with an arrow (unidirectional or bi-directional). A generic hyperlink is denoted with $HYP_{ij\text{-}ij}$, wherein the first pair of indexes ij indicates a source diagram $DIA_{ij}$ and the second pair of indexes ij indicates a target diagram $DIA_{ij}$; for example, the hyperlink $HYP_{35\text{-}43}$ shown in the figure connects the diagram $DIA_{35}$ (in the model $MOD_3$) and the diagram $DIA_{43}$ (in the model $MOD_4$).

This organization of the models MODi results in a graph 200 (wherein the diagrams $DIA_{ij}$ are the nodes and the hyperlinks $HYP_{ij\text{-}ij}$ are the arcs). As a consequence, any reader can move from one diagram $DIA_{ij}$ to another diagram $DIA_{ij}$ either in the same or in another model $MOD_i$. As can be seen, however, the graph 200 is very complex and chaotic. The structure becomes unmanageable in a real scenario, wherein the graph 200 may include hundreds of models $MOD_i$ that are represented with thousands of diagrams $DIA_{ij}$.

In the solution according to an embodiment of the invention, different navigation paths $NAV_k$ (with k>=2) are defined on the graph 200. Each navigation path $NAV_k$ is specified by a set of selected diagrams $DIA_{ij}$, which are ordered in a desired sequence. The navigation paths $NAV_k$ provide alternative views of the graph 200. For example, a navigation path $NAV_1$ touches the diagrams $DIA_{ij}$ (in the different models MODi) that are relevant for a management of the development process; conversely, a navigation path $NAV_2$ touches the diagrams $DIA_{ij}$ that are relevant for an architectural definition of the software application.

Therefore, each navigation path $NAV_k$ strongly facilitates the reading of the graph 200 (guiding the reader among the available information, like an Ariadne's thread). Particularly, the navigation paths $NAV_k$ allow moving in the graph 200 according to different contingent needs. For example, it is possible to define different navigation paths $NAV_k$ for developers, clients, executives, and the like (each one providing an overview of the software application under development at different levels of detail). In other words, with the solution described above any reader may traverse the graph 200 in a very simple way, only touching the diagrams $DIA_{ij}$ that are really of interest to him/her. Therefore, the consultation of the models $MOD_i$ is not hindered by information that is not relevant for the specific purpose.

Figure 3A:
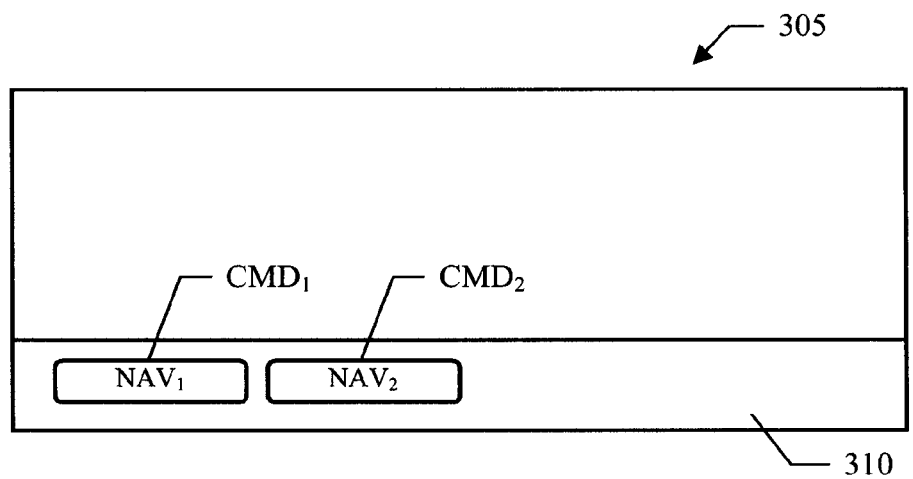
Figure 3B:
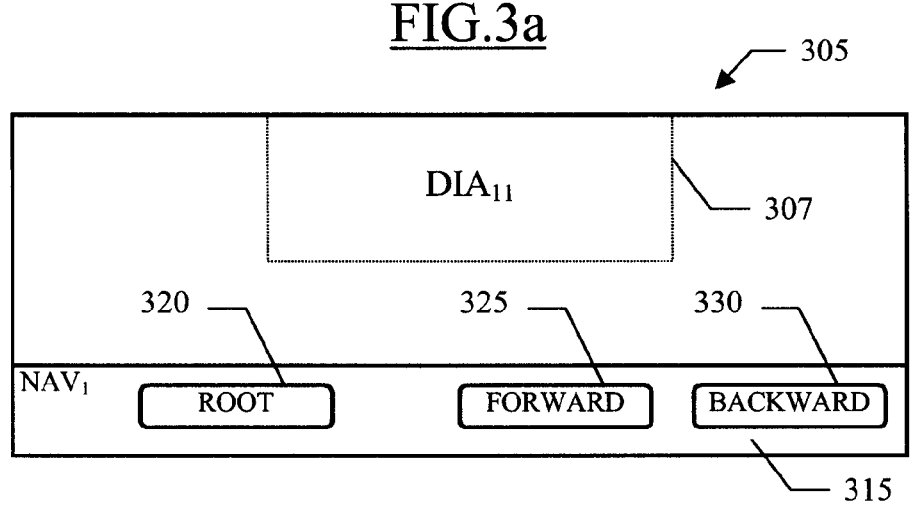
Figure 3C:
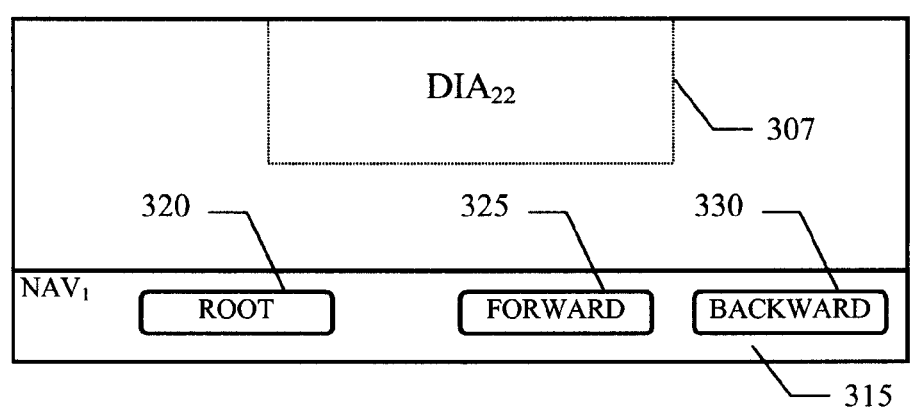

Moving to FIG. 3a, the models $MOD_i$ are graphically represented in a window 305. Particularly, the window 305 shows a graphical representation of each diagram $DIA_{ij}$, together with different commands for its management (such as create, edit, and the like). In addition, the window 305 also includes a home bar 310. The home bar 310 shows a selection button $CMD_k$ for each available navigation path $NAV_k$; in the example at issue, a selection button $CMD_1$ is associated with the navigation path $NAV_1$, and a selection button $CMD_2$ is associated with the navigation path $NAV_2$ Whenever the reader clicks (with the mouse) on a specific selection button $CMD_k$, a first diagram $DIA_{ij}$ of the corresponding navigation path $NAV_k$ is retrieved and displayed. For example, as shown in FIG. 3b, if the reader chooses the selection button $CMD_1$, the graphical representation of the first diagram $DIA_1$ in the navigation path $NAV_1$ (denoted with 307) is shown in the window 305. At the same time, the home bar is replaced with a navigation bar 315. The navigation bar 315 includes a root button 320 for moving to the first diagram $DIA_{11}$ directly, a forward button 325 for advancing to a next diagram $DIA_{ij}$, and a backward button 330 for returning to a previous diagram $DIA_{ij}$. In this way, the reader can traverse the diagrams $DIA_{ij}$ of interest (in the selected navigation path $NAV_1$) with simple and immediate commands. For example, if the reader clicks on the forward button 325, the graphical representation 307 of the next diagram ($DIA_{22}$ in this case) is retrieved and displayed in the window 305, as shown in FIG. 3c. Moreover, once the current navigation path $NAV_1$ has been completed, the corresponding navigation bar 315 is closed automatically and replaced with the home bar; for example, this result is achieved by clicking on the forward button 325 in a last diagram ($DIA_5$, in this case), by clicking on the backward button 330 in the first diagram $DIA_{11}$, or by closing the navigation bar 315 directly.

Figure 4:
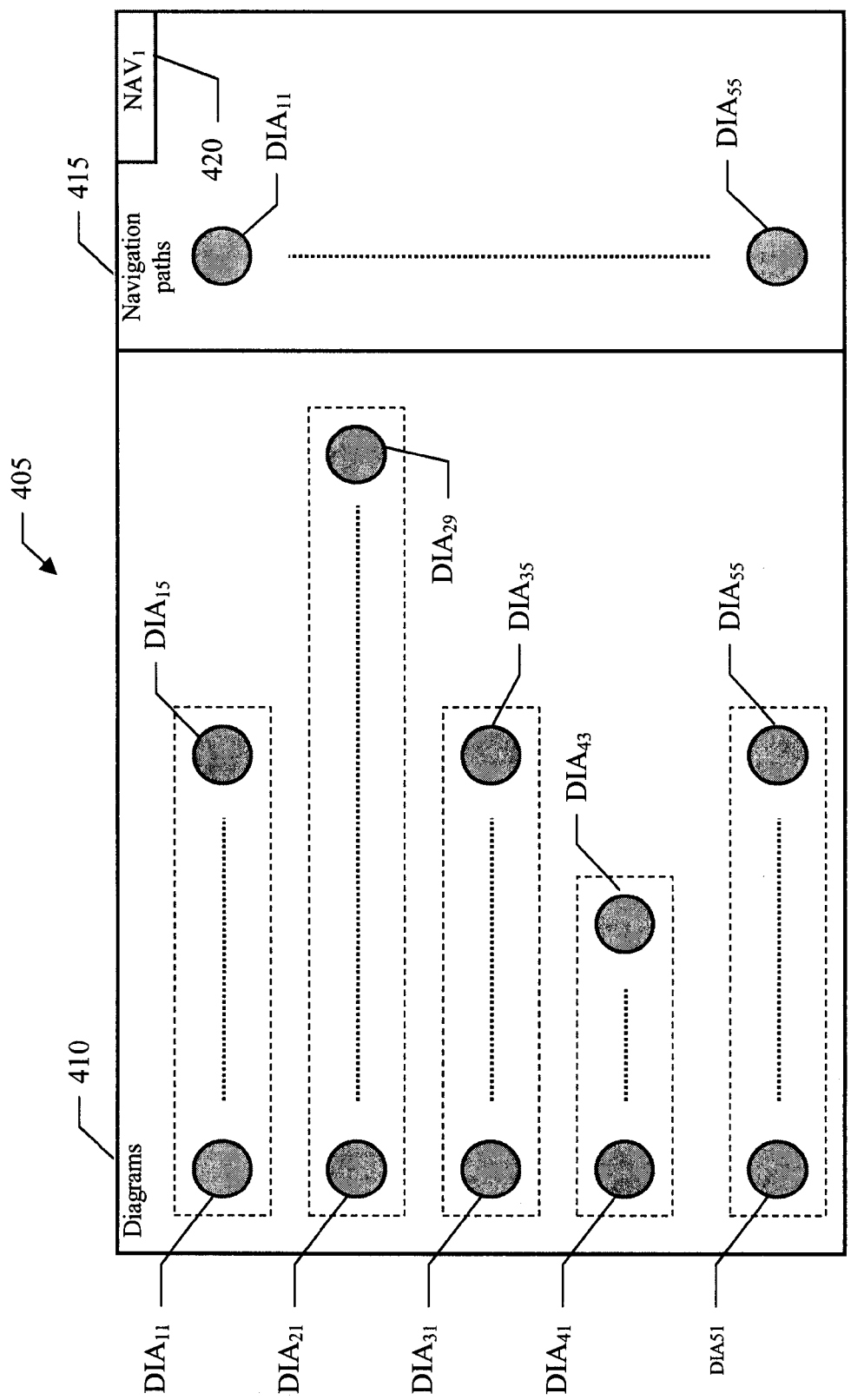

Considering now FIG. 4, the navigation paths $NAV_k$ are typically defined graphically by using a window 405. Particularly, the window 405 includes a diagram frame 410, which is used to depict each available diagram $DIA_{ij}$ by means of a corresponding graphical object (a circle in the example at issue); preferably, the graphical objects of the diagrams $DIA_{ij}$ for each model $MOD_i$ are condensed into a further corresponding graphical object that may be expanded on request. In addition, the window 405 also includes a definition frame 415. The definition frame 415 includes a selection box 420, which is used to create a new navigation path or to edit a preexisting one (such as the navigation path $NAV_1$ in the example at issue). The remaining part of the definition frame 415 shows the graphical objects of the diagrams $DIA_{ij}$ included in the selected navigation path $NAV_1$ (according to their order in the corresponding sequence). The developer can now define the navigation path $NAV_1$ by simply manipulating the graphical objects of the diagrams $DIA_{ij}$. For example, it is possible to select the graphical object of a diagram $DIA_{ij}$ in the frame 410, and then drag this graphical object to the definition frame 415 (in the desired position); moreover, it is also possible to move the graphical object of a diagram $DIA_{ij}$ in the definition frame 415 to another position, or to delete the graphical object of a diagram $DIA_{ij}$ in the same definition frame 415.

This operation generates a series of tags, which define the position of each diagram $DIA_{ij}$ in the different navigation paths $NAV_k$. Preferably, the definition of each diagram $DIA_{ij}$ is specified in the Extensible Markup Language (XML), which allows the creation of customized tags for any desired purpose. In the specific case, the definition of the diagram $DIA_{ij}$ starts with a tag "nodeName" (for a mnemonic name thereof) and a tag "id" (for its unique identifier $DIA_{ij}$). For each navigation path $NAV_k$ passing through the diagram $DIA_{ij}$, a tag "navigatorId" specifies its unique identifier $NAV_k$, and a tag "position" indicates the position of the diagram $DIA_{ij}$ in the corresponding sequence. The definition of the diagram $DIA_{ij}$ ends with a tag <\nodeName>. For example, the diagram $DIA_{24}$ shown in FIG. 2 will be defined by the tags:

```
<nodeName="Diagram DIA₂₄" id=DIA₂₄>
    <navigatorId=NAV₁" position=3>
    <navigatorId=NAV₂" position=2>
<\nodeName>
```

The above-described tags can then be converted automatically into the XML representation of all the navigation paths $NAV_k$. For this purpose, the definition of each navigation path $NAV_k$ starts with a tag "Navigator name" (for a mnemonic name thereof) and a tag "id" (for its unique identifier $NAV_k$). For each diagram $DIA_{ij}$ included in the navigation path $NAV_k$, a tag "nodeName" is used to identify it; the hyperlink for moving to the first diagram in the sequence is enclosed between the tags <homeName> and <\homeName>, the hyperlink for moving to the next diagram is enclosed between the tags <nextName> and <\nextName>, and the hyperlink for moving to the previous diagram is enclosed between the tags <prevName> and <\prevName> (when available). The definition of the navigation path $NAV_k$ ends with a tag <\Navigator>. For example, the navigation path $NAV_1$ shown in FIG. 2 will be defined by the tags:

```
<Navigator name="Navigation path NAV₁" id=NAV₁>
    <nodeName=DIA₁₁>
    <rootName><\rootName>
    <nextName>DIA₂₂<\nextName>
    <prevName><\prevName>
    <nodeName=DIA₂₂>
    <rootName>DIA₁₁<\rootName>
    <nextName>DIA₂₄<\nextName>
    <prevName>DIA₁₁<\prevName>
    ..........
    <nodeName=DIA₅₁>
    <rootName>DIA₁₁<\rootName>
    <nextName><\nextName>
    <prevName>DIA₄₁<\prevName>
<\Navigator>
```

It should be noted that the definition of the navigation paths $NAV_k$ is completely independent and separate from the definition of the models $MOD_i$. Therefore, the desired result may be achieved without the need of updating the diagrams $DIA_{ij}$. This makes the maintenance of the navigation paths $NAV_k$ very simple (without the risk of introducing any error into the models $MOD_i$).

Figure 5:
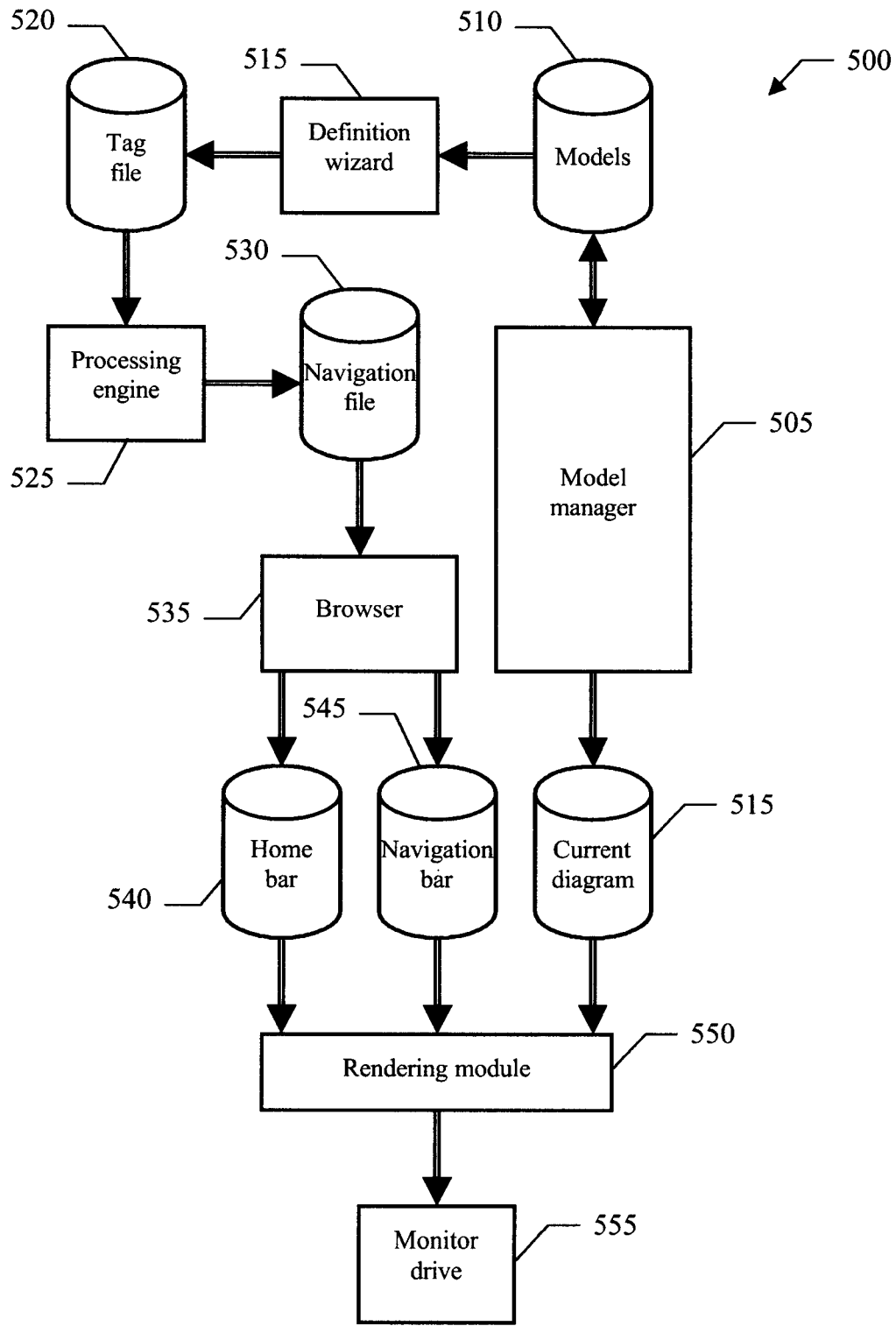
FIG. 5 shows the main software components that can be used to practice the solution according to an embodiment of the invention.

Moving now to FIG. 5, the main software components that run on the computer to implement the above-described solution are denoted as a whole with the reference 500. The information (programs and data) is typically stored on the hard-disk and loaded (at least partially) into the working memory of the computer when the programs are running, together with an operating system and other application programs (not shown in the figure). The programs are initially installed onto the hard disk, for example, from CD-ROM.

Particularly, the computer includes a modeling tool (for example, the above-mentioned "Rational Rose"). The core module of this tool is a model manager 505, which is used to define a series of models $MOD_i$ (in the UML format) for each software application under development. The definition of the models $MOD_i$ with the corresponding diagrams $DIA_{ij}$ (for each software application) is stored into a repository 510. The model manager 505 loads the graphical representation of a current diagram $DIA_{ij}$ from the model repository 510 into a working area (denoted with 515).

In an embodiment of the present invention, the modeling tool has been extended with a plug-in for implementing the proposed navigation functionality. For this purpose, a definition wizard 515 accesses the model repository 510. The definition wizard 515 implements a graphical user interface, which is used to define the different navigation paths $NAV_k$ as described above. The tags so obtained for each diagram $DIA_{ij}$ (of the model repository 510) are stored into a corresponding file 520. A processing engine 525 reads the tag file 520, and converts it into the definition of the available navigation paths $NAV_k$. This information is then saved into a navigation file 530.

A browser 535 interprets the content of the navigation file 530. First of all, the browser 535 generates the definition of the home bar (denoted with 540); particularly, the home bar will include a selection button for each navigation path $NAV_k$ defined in the navigation file 530. Moreover, for each diagram $DIA_{ij}$ that is traversed along a selected navigation path $NAV_k$, the browser 535 dynamically generates the definition of the associated navigation bar (denoted with 545); particularly, the navigation bar will include the root button (associated with the hyperlink to the first diagram $DIA_{ij}$), the forward button (associated with the hyperlink to the next diagram $DIA_{ij}$), and the backward button (associated with the hyperlink to the previous diagram $DIA_{ij}$), as specified in the corresponding portion of the navigation file 530.

A rendering module 550 receives the graphical representation of the current diagram 515 (from the model manager

505); moreover, the rendering module 550 also receives the definition of the home bar 540 or the definition of the current navigation bar 545 (from the browser 535). The rendering module 550 assembles the received information into the window of the modeling tool as described above. Particularly, at the beginning the rendering module 550 will add the definition of the home bar 540 to the graphical representation of the current diagram 515. As soon as the reader selects a specific navigation path $NAV_k$ (by clicking on the corresponding selection button shown in the home bar), the hyperlink associated with this selection button is invoked. In response thereto, the model manager 505 automatically loads the graphical representation of the first diagram $DIA_{ij}$ of the corresponding sequence (into the working area 515). At the same time, the browser 535 generates the definition of the associated navigation bar 545 according to the relevant information available in the navigation file 530. In this way, the rendering module 550 can now add the definition of the required navigation bar 545 to the graphical representation of the new current diagram 515. In any case, the graphical representation of the current diagram so updated is then supplied to a monitor drive 555 for its displaying.

The same operations are continually repeated until all the diagrams $DIA_{ij}$ of the selected navigation path $NAV_k$ have been traversed. At this point, the rendering module 550 adds the definition of the home bar 540 again to the graphical representation of the current diagram 515. The same process may then be reiterated for any other navigation path $NAV_k$.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure or includes similar elements (such as a cache memory temporarily storing the programs or parts thereof to reduce the accesses to the hard disk during execution); in any case, it is possible to replace the computer with any code execution entity (such as a PDA, a mobile phone, and the like). Although in the preceding description reference has been made to a single computer for the sake of simplicity, it should be readily apparent that the proposed solution may also be applied in a data processing system with distributed architecture; in this case, each developer works on a corresponding workstation, with the results of the modeling process that are collected on a central server for different readers.

In any case, the principles of the invention should not be limited to the described examples (with the same solution that can find application with any other models, diagrams, hyperlinks, and navigation paths); more generally, the graph may be defined by any equivalent nodes and/or arcs (even not consisting of hyperlinks).

Moreover, nothing prevents the implementation of the home bar and/or navigation bar with similar structures (for example, a pull-down menu). It should also be apparent that the provision of the navigation bar with explicit commands for traversing the selected navigation path is not strictly necessary; for example, it is also possible to move from each diagram to the next one in the sequence automatically (after a predefined time-out).

Different commands for traversing the selected navigation path are also tenable (such as the forward command only).

Similar considerations apply if the home bar and/or the navigation bar have different appearances.

It should be readily apparent that the reference to the XML format is merely illustrative. Indeed, the tag file and/or the navigation file may also be defined with other formalisms; in any case, the possibility of generating the definition of the navigation paths directly (without any intermediate tag file) is contemplated.

Alternatively, the navigation paths may be defined by means of another graphical interface. For example, in a more sophisticated implementation it is possible to have sub-sequences of the diagrams that are common to multiple navigation paths (so as to facilitate their definition); moreover, whenever a new diagram is inserted into a specific navigation path, the definition wizard may automatically determine the closest diagrams in the other navigation paths, so as to suggest its insertion in a similar position. However, a different implementation wherein the navigation paths are defined in a different way (even by means of a text editor) is within the scope of the invention.

The technical idea of the invention may also be applied in an embodiment wherein the different buttons for traversing the selected navigation path are directly inserted into the definition of the relevant diagrams (instead of adding a separate navigation bar).

Even though in the preceding description reference has been made to a specific modeling tool with the supported UML diagrams, this is not to be intended as a limitation. Indeed, similar considerations apply to whatever modeling tool or to any other UML diagrams. Alternatively, the technical idea of the invention has equal application to different formalisms for defining the models (such as Petri networks).

More generally, the same solution may also find application in other fields. For example, the proposed technique is useful to define preferred navigation paths through selected web pages in the Internet (for example, to move throughout a complex web site according to different needs). Another possible application of the same solution is in a presentation tool. In this case, it is possible to define a set of slides for different presentations; each presentation is then specified by a corresponding navigation path through selected slides. In this way, different presentations for corresponding groups of people may be generated automatically.

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

What is claimed is:

1. A method for navigating Unified Modeling Language (UML) diagrams, the method comprising:
    identifying a graph structure that represents a software application including at least one model, the graph structure further including at least one Unified Modeling Language diagram, where each Unified Modeling Language diagram defines a node in a plurality of nodes of the graph, wherein the plurality of nodes is interconnected by a plurality of predetermined hyperlinks;
    identifying a plurality of navigation paths that are both independent of each other and independent of the predetermined hyperlinks, each navigation path defined by:
        selecting, based upon user input, a set of nodes from the plurality of nodes;
        ordering, based upon user input, the selected set of nodes in a desired sequence; and
        defining a single path along the sequence such that:
            a root node in the sequence connects to only one other node in the sequence,
            a last node in the sequence connects from only one node in the sequence, and
            remaining nodes in the sequence connects from only one node in the sequence and connects to only one node in the sequence;
    enabling a user to select one of the plurality of navigation paths; and
    enabling a user to interact with the graph structure at the nodes along the selected navigation path by:
        traversing the nodes along the sequence of the selected navigation path;
        displaying, within the software modeling environment, the Unified Modeling Language diagram of the traversed node; and
        enabling a user to edit the displayed Unified Modeling Language diagram while traversing the nodes.

2. The method according to claim 1, wherein for each traversed node, the method further comprises:
    displaying a navigation structure in addition to the Unified Modeling Language diagram of the traversed node, the navigation structure including at least one navigation command for traversing the nodes of the selected navigation path.

3. The method according to claim 2, wherein the at least one navigation command includes a forward command for moving to a next node of the selected navigation path and/or a backward command for moving to a preceding node of the selected navigation path.

4. The method according to claim 2, wherein: the graphical representation of each traversed node is displayed in a window, and displaying the navigation structure comprises displaying a command bar including the at least one navigation command to the window.

5. The method according to claim 1, wherein:
    a definition of the graph structure is stored independently from definitions of the navigation paths.

6. The method according to claim 5, wherein:
    the definitions of the navigation paths are stored independently from each other.

7. The method according to claim 5, wherein displaying the navigation structure in addition to the Unified Modeling Language diagram of the traversed node includes:
    retrieving the definition of the Unified Modeling Language diagram of the traversed node,
    obtaining a definition of the corresponding navigation structure from the definition of the selected navigation path,
    updating the definition of the Unified Modeling Language diagram of the traversed node by inserting the definition of the corresponding navigation structure, and
    rendering the updated definition of the Unified Modeling Language diagram of the traversed node.

8. The method according to claim 5, wherein:
    a graphical object is associated with each node, and
    defining the navigation paths further comprises:
        displaying at least part of the graphical objects,
        arranging the graphical objects associated with the nodes of each navigation path according to the corresponding sequence,
        determining the definition of each navigation path from the corresponding arrangement of the graphical objects, and
        storing the definition of each navigation path into the second memory structure.

9. The method according to claim 1, wherein enabling a user to interact with the graph structure at the nodes along the selected navigation path further comprises enabling a user to jump from any node within the path to the root node.

10. A non-transitory computer-usable storage medium embodying a computer program, the computer program when executed on a data processing system for navigating Unified Modeling Language (UML) diagrams, comprising:
    identifying a graph structure that represents a software application including at least one model, the graph structure further including at least one Unified Modeling Language diagram, where each Unified Modeling Language diagram defines a node in a plurality of nodes of the graph, wherein the plurality of nodes is interconnected by a plurality of predetermined hyperlinks;
    identifying a plurality of navigation paths that are both independent of each other and independent of the predetermined hyperlinks, each navigation path defined by:
        selecting, based upon user input, a set of nodes from the plurality of nodes;
        ordering, based upon user input, the selected set of nodes in a desired sequence; and
        defining a single path along the sequence such that:
            a root node in the sequence connects to only one other node in the sequence,
            a last node in the sequence connects from only one node in the sequence, and
            remaining nodes in the sequence connects from only one node in the sequence and connects to only one node in the sequence;
    enabling a user to select one of the plurality of navigation paths; and
    enabling a user to interact with the graph structure at the nodes along the selected navigation path by:
        traversing the nodes along the sequence of the selected navigation path;
        displaying, within the software modeling environment, the Unified Modeling Language diagram of the traversed node; and
        enabling a user to edit the displayed Unified Modeling Language diagram while traversing the nodes.

11. The non-transitory computer-usable storage medium according to claim 10, wherein for each traversed node, the computer program product further comprises:

displaying a navigation structure in addition to the Unified Modeling Language diagram of graphical representation of the traversed node, the navigation structure including at least one navigation command for traversing the nodes of the selected navigation path.

12. The non-transitory computer-usable storage medium according to claim 11, wherein the at least one navigation command includes a forward command for moving to a next node of the selected navigation path and/or a backward command for moving to a preceding node of the selected navigation path.

13. The non-transitory computer-usable storage medium according to claim 11, wherein:
the Unified Modeling diagram of graphical representation of each traversed node is displayed in a window, and
displaying the navigation structure comprises displaying a command bar including the at least one navigation command to the window.

14. The non-transitory computer-usable storage medium according to claim 11, wherein:
a definition of the graph structure is stored independently from definitions of the navigation paths.

15. The non-transitory computer-usable storage medium according to claim 14, wherein displaying the navigation structure in addition to the Unified Modeling Language diagram of the traversed node includes:
retrieving the definition of the Unified Modeling Language diagram of the traversed node,
obtaining a definition of the corresponding navigation structure from the definition of the selected navigation path,
updating the definition of the Unified Modeling Language diagram of the traversed node by inserting the definition of the corresponding navigation structure, and
rendering the updated definition of the Unified Modeling Language diagram of the traversed node.

16. The non-transitory computer-usable storage medium according to claim 14, wherein:
a graphical object is associated with each node, and
defining the navigation paths further comprises:
displaying at least part of the graphical objects,
arranging the graphical objects associated with the nodes of each navigation path according to the corresponding sequence,
determining the definition of each navigation path from the corresponding arrangement of the graphical objects, and
storing the definition of each navigation path into the second memory structure.

17. The non-transitory computer-usable storage medium according to claim 10, wherein the computer program product further implements: a home bar for selecting one of the navigation paths, a navigation bar for traversing the nodes of the selected navigation path, and a window for displaying the Unified Modeling Language diagram of each traversed node.

18. The non-transitory computer-usable storage medium according to claim 10, wherein the computer program product further implements: an interface that enables a user to create a new Unified Modeling Language diagram within the navigation path.

19. The non-transitory computer-usable storage medium according to claim 10, wherein enabling a user to interact with the graph structure at the nodes along the selected navigation path further comprises enabling a user to jump from any node within the path to the root node.

* * * * *